Jan. 13, 1948.　　　　　L. L. HERCIK　　　　　2,434,613
COUNTERBALANCING MECHANISM FOR MACHINE TOOLS
Filed Dec. 31, 1945　　　　　4 Sheets-Sheet 1

INVENTOR:
LAD L. HERCIK
BY
　　　　　Herman Eiche
ATTORNEY.

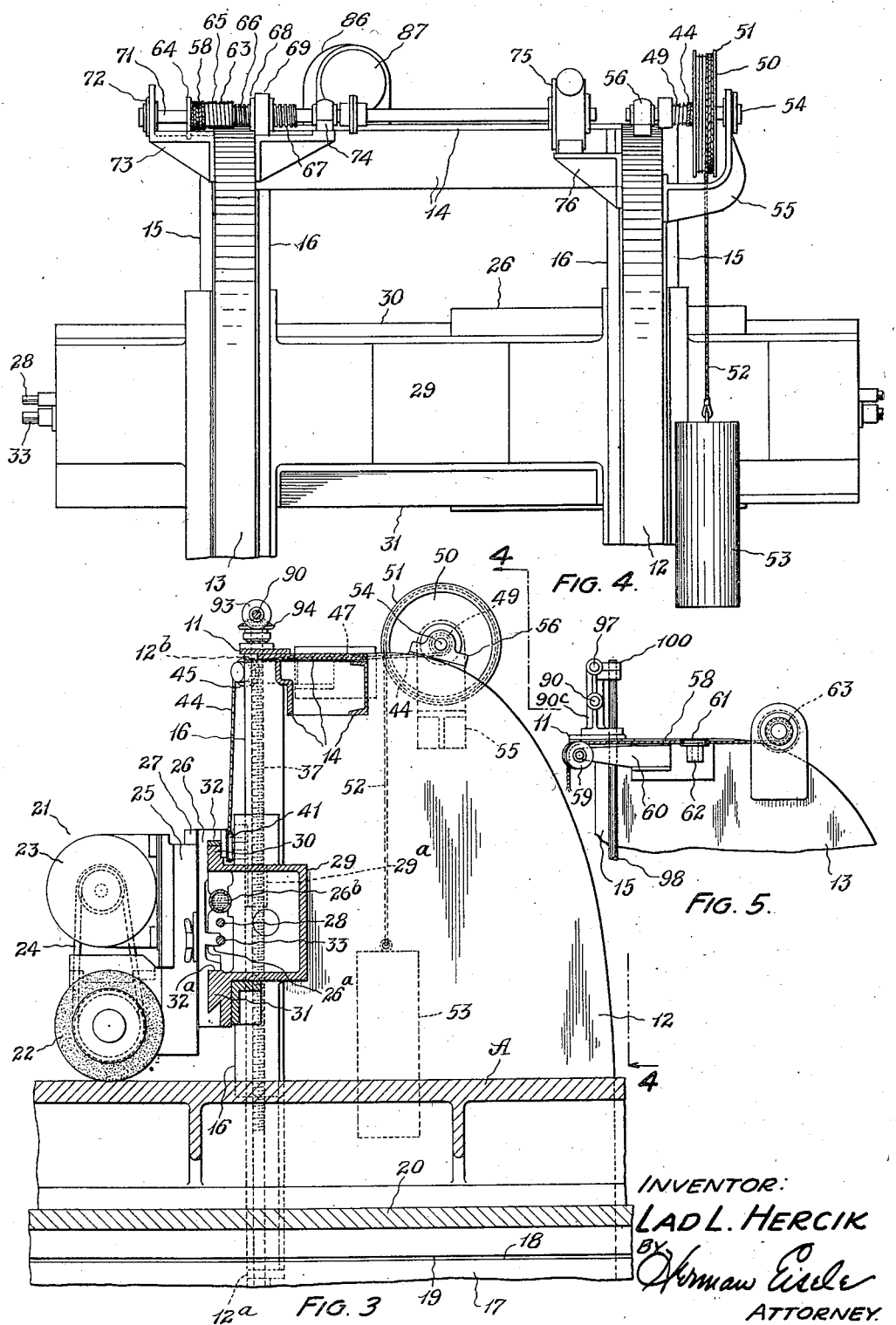

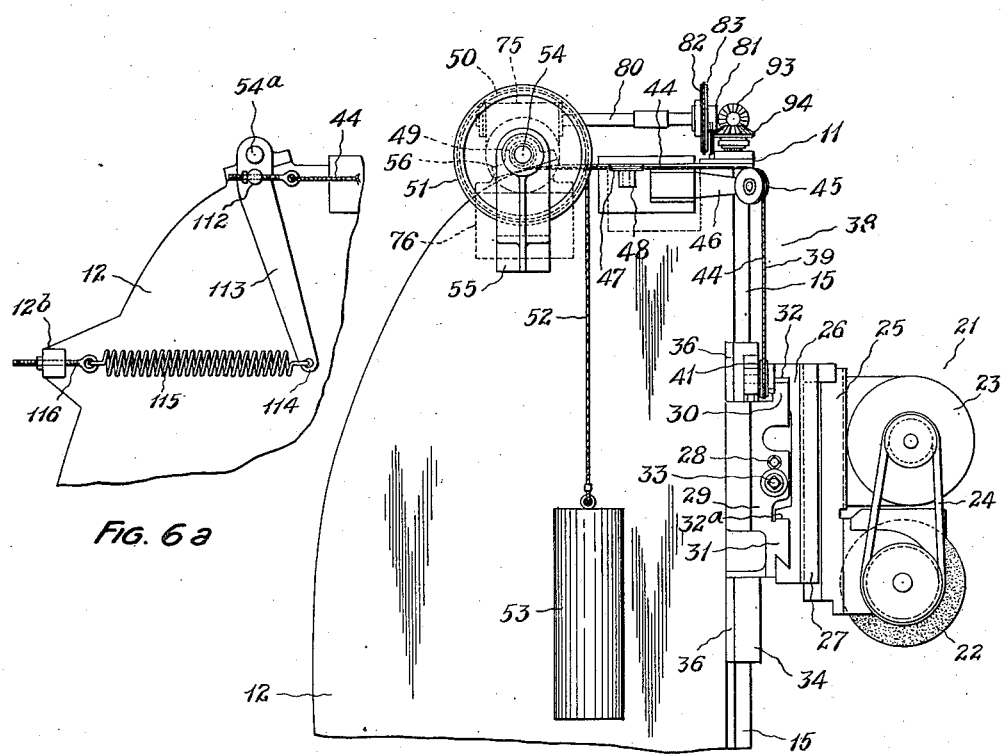
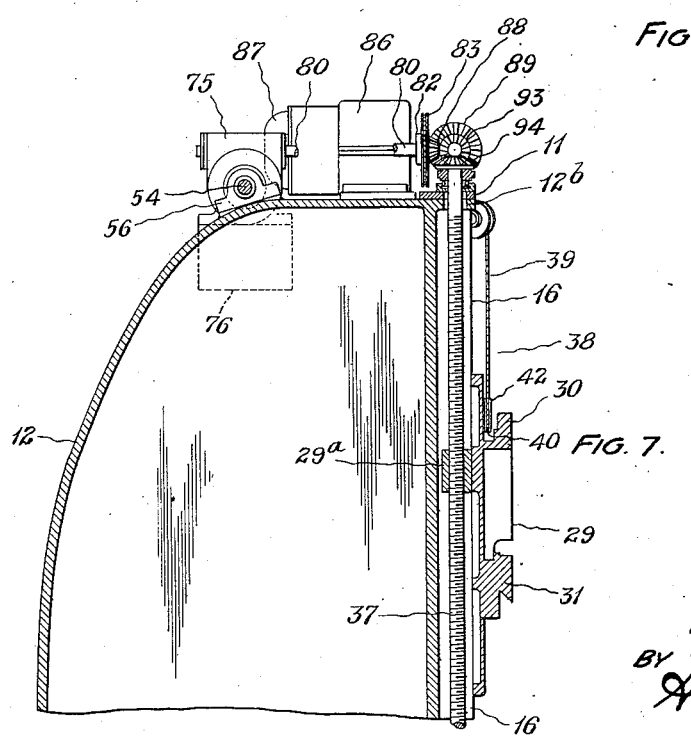

Jan. 13, 1948.                L. L. HERCIK                2,434,613
                COUNTERBALANCING MECHANISM FOR MACHINE TOOLS
                 Filed Dec. 31, 1945            4 Sheets—Sheet 4
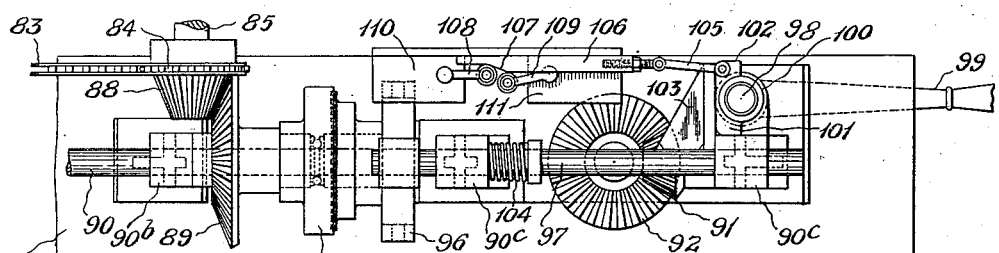
FIG. 9.
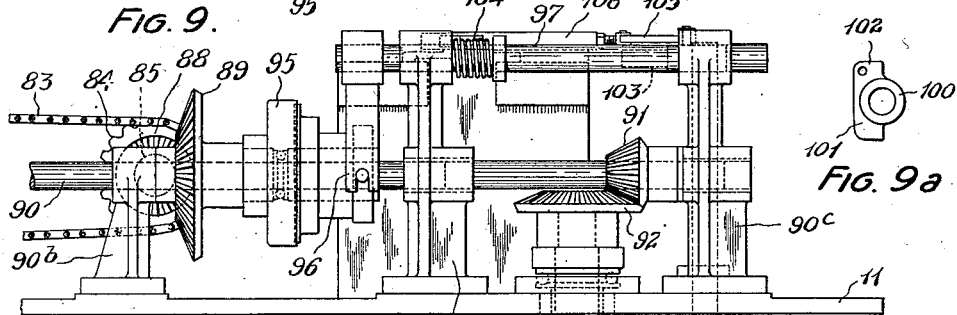
FIG. 9a.
FIG. 8.
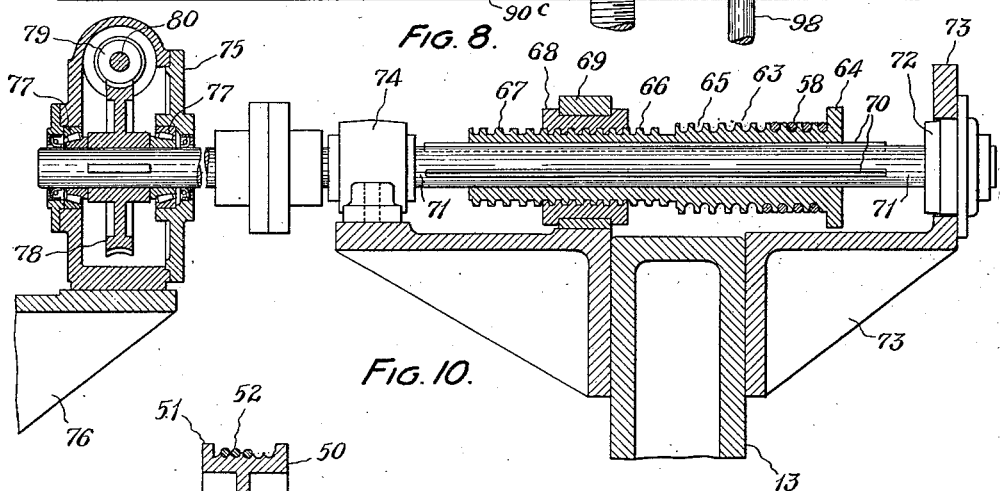
FIG. 10.
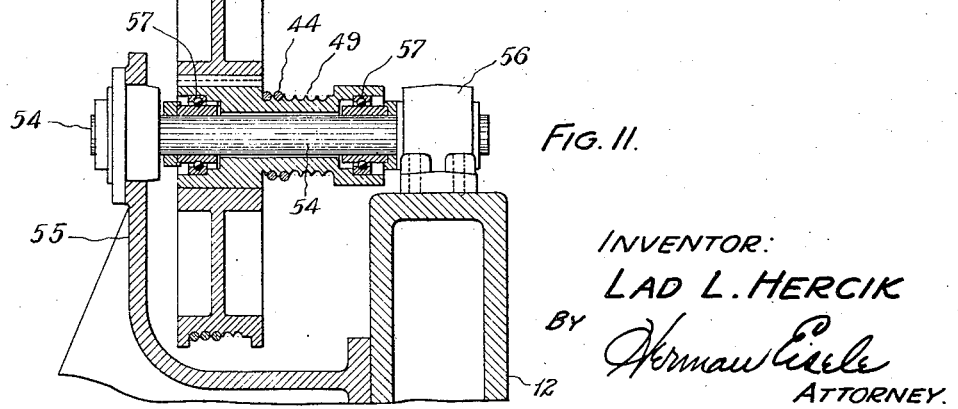
FIG. 11.
INVENTOR:
LAD L. HERCIK
BY
Herman Eisele
ATTORNEY.

Patented Jan. 13, 1948

2,434,613

UNITED STATES PATENT OFFICE 2,434,613

COUNTERBALANCING MECHANISM FOR MACHINE TOOLS

Lad L. Hercik, Lakewood, Ohio

Application December 31, 1945, Serial No. 638,529

21 Claims. (Cl. 51—166)

This invention relates generally to improved mechanisms for counterbalancing relatively heavy vertically movable objects in machine structures.

The herein described embodiment of this invention is disclosed in its application to machine tools and particularly to larger machine tools which include as a part of their construction heavy tool heads, tool slides, cross rails, or other parts which are moved or shifted vertically in the course of the adjustment of or operation of machine tools, such as planers, boring mills, drill presses, radial drills, milling machines, power presses, surface grinders and the like.

In machinery of this class devices have long been used for counterbalancing the weight of vertically movable parts for the purpose of reducing the effort or power required for moving these parts. These devices have usually comprised a counterweight and associated cable or chain means passing over idle counterweight wheels such as pulleys, sheaves, or sprockets. As the size of machine tools was increased, the weight of the tool heads, cross rails, and similar parts was naturally increased proportionately and the larger size of the counterweight required became objectionable due to the space requirements, accident hazards and unsightly appearance. Further, as the range of adjustment of the vertically movable parts on the machine tools increased, the corresponding distance of travel of the counterweight increased to such an extent as to make arrangements necessary either to permit the travel of the counterweight below the floor or to provide upwardly projecting brackets for the counterweight wheels above the machine, both of which expedients were undesirable and sometimes impossible.

This present invention eliminates the need for heavy counterweights and likewise makes unnecessary the long vertical path of travel required by counterweights in previously known counterbalancing systems and produces further desirable additional improvements in counterbalancing mechanisms adapted for use on machine tools.

It is accordingly a prime object of this invention to provide a counterbalancing mechanism which makes possible the complete counterbalancing of a relatively heavy cross rail, tool head or the like, in a machine tool, by means of a relatively small counterweight.

It is a further prime object of this invention to produce a counterbalancing mechanism which makes unnecessary the provision of a long space for counterweight travel.

It is a further and combined object of this invention to produce a counterbalancing mechanism which utilizes a counterweight weighing considerably less than the weight of the parts which it counterbalances and which mechanism reduces the vertical travel of the counterweight to a distance considerably less than the corresponding vertical travel of the parts counterbalanced.

It is a further specific object of one form of this invention to produce a counterbalancing mechanism which substantially entirely eliminates the vertical travel of the counterweight.

It is a further object of this invention to provide, in a counterbalancing mechanism, a compensating device adapted to produce a differential between the rates of travel of the counterweight and the counterbalanced parts.

It is a further specific object of this invention to provide a compensating device adapted to maintain the counterweight substantially stationary thruout the entire range of travel of the part being counterbalanced by the counterweight.

It is a further object of this invention to provide, in a counterbalancing mechanism including such a compensating device, a single source of power which serves as the means for moving the parts to be adjusted and simultaneously actuates the compensating device.

It is a further and ancillary object of this invention to provide a mechanism of this class having a cable-supported counterweight in which the cable is supported by idle pulleys or sheaves and in which the cable is substantially stationary with references to these pulleys, as a result of which the life of the cable is substantially increased.

A further understanding of the construction and operation of this invention and of the manner in which the novel features of this invention effect the above and further objects, will become apparent from the following detail description and the annexed drawings, which set forth certain means embodying this invention, such disclosed means constituting, however, but one of the forms in which the principle of this invention may be applied. This invention is illustrated in the accompanying drawings and will be described in its application to a double housing horizontal surface grinding machine.

Referring to the annexed drawings:

Fig. 3 is a fragmentary longitudinal section thru the surface grinding machine illustrated in Fig. 1, this view being taken in the planes indicated by the broken line 3, 3, in Fig. 1.

Fig. 4 is a fragmentary rear elevation showing the rear of the upper portion of the uprights, cross rail, and counter-balancing mechanism of this surface grinding machine, this view being taken from the planes indicated by broken line 4, 4 in Fig. 3.

Fig. 5 is a fragmentary right side elevation of the upper portion of the right housing of this surface grinding machine, this view being taken from the plane indicated by line 5, 5 in Fig. 1.

Fig. 6 is a fragmentary side elevation of the upper portion of the left housing of this machine, this view being taken from the plane indicated by line 6, 6 in Fig. 1.

Fig. 6a is a modified form of certain mechanism shown in Fig. 6.

Fig. 7 is a vertical longitudinal section taken on a plane thru the center of one of the uprights or columns of the housing of this machine, this view being taken on the plane indicated by line 7, 7 in Fig. 1, the tool slide being omitted.

Fig. 8 is an enlarged fragmentary view of a part of Fig. 1 showing a portion of the cross rail raising and lowering mechanism.

Fig. 9 is a plan view of the mechanism illustrated in Fig. 8.

Fig 9a is a detached plan view of one element shown in Fig. 9.

Fig. 10 is a fragmentary enlarged vertical transverse section thru an auxiliary drum shaft and drive therefor, these elements comprising essential parts of the compensating device and this view being taken on the plane indicated by line 10, 10 in Fig. 2.

Fig. 11 is an enlarged transverse axial section thru a certain counterweight drum mechanism, this view being taken on the plane indicated by the line 11, 11 in the Fig. 2.

Figures 1, 2:
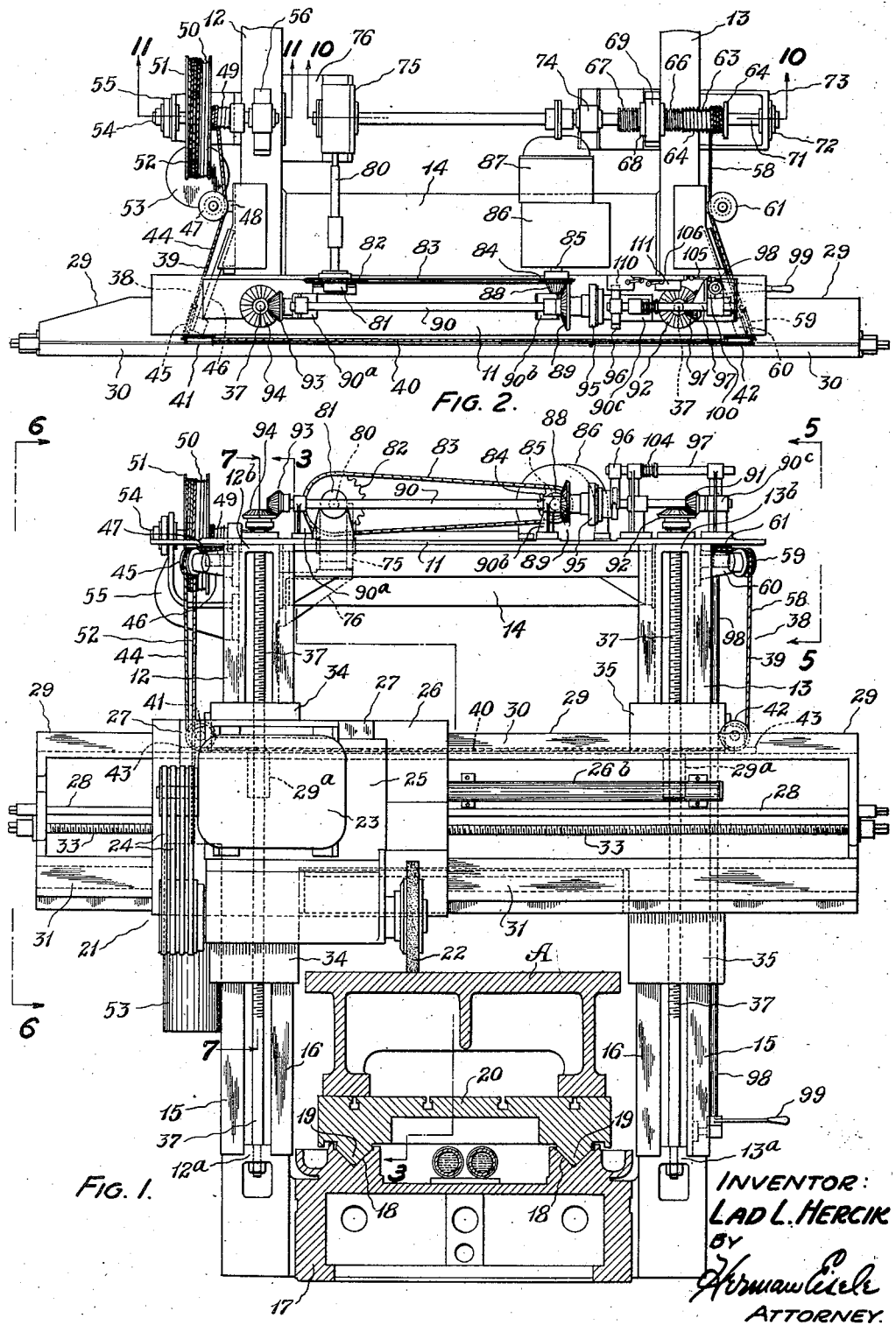
Fig. 1 is a front elevational, part sectional view of a double housing horizontal surface grinding machine, embodying this invention, the section being taken transversely thru the bed and table of the machine, in a direction facing the front of the uprights or columns of the housing, cross rail, tool slide and counterbalancing mechanism of the machine.
Fig. 2 is a plan view of the upper portion of the surface grinding machine illustrated in Fig. 1, the tool slide being omitted.

As shown in the drawings, the machine comprises a pair of relatively widely spaced heavy upright housings or columns 12 and 13, relatively deep fore and aft, hollow in cross section, and connected at their tops by a transverse tie member 14. The forward edge of each of the uprights 12 and 13 is formed with outer and inner spaced ways or flanges 15 and 16, respectively, defining a vertically extending recess terminating at upper transverse walls 12b, 13b and at lower walls 12a, 13a respectively. The vertically extending flanges 15 and 16 extend laterally away from the associated walls of the housing 12 and 13, for a purpose presently to appear.

Arranged between the lower end of the uprights 12 and 13, is an elongated base casting 17, having longitudinally extending, spaced, V-grooves or ways 18, adapted for the reception of slide tongues 19, V-shaped in cross section and forming a part of a work carrying table 20. The table 20 is adapted to be longitudinally reciprocated by any suitable mechanism, not shown in detail, hydraulically actuated means of a well known type being preferably employed for this purpose. While many types of work may be processed on this machine, a machine base casting A is shown, for purposes of illustration, in position on the table 20.

Mounted to reciprocate transversely across and above the table 20, is an overlying tool head 21. The tool head 21 includes a grinding wheel 22, driven by a motor 23, thru belt means 24, these and related parts being carried by a vertical slide or support 25. The slide 25 is mounted for vertical adjustment upon a tool head saddle 26 thru the medium of slideways 27 which slidably connect the slide 25 to the saddle 26. Vertical adjustment of the tool head slide 25 with reference to the saddle 26 is affected thru manipulation of a horizontal shaft 28, actuating a vertical screw which in turn engages a nut member affixed to the slide 25 these actuating elements not being shown in detail as they do not form part of this invention.

The saddle 26 is mounted for horizontal reciprocation upon a cross-rail or transverse rail member 29, which may be in the form of a skeleton or hollow casting, having upper and lower spaced rails 30 and 31 slidably interconnected with the saddle 26, as at 32 and 32a, so as to support the saddle 26, and its associated parts.

Two separate means are provided for effecting the transverse movement of the saddle 26 on the cross rail 29. For the setting up of the machine and for other manual transverse adjustment of the saddle 26 and tool head parts, a worm shaft 33 is provided extending longitudinally thru the cross rail casting 29 and engaging a disconnectable nut member 26a mounted on the saddle 26. Each end of the shaft 33 is formed with a square adapted to be engaged by a suitable crank handle wrench, whereby the shaft may be manually rotated. For the progressive lateral reciprocation of the tool head and saddle in the regular grinding operation of the machine, there are provided hydraulic means including a cylinder 26b, Figures 1 and 3, this hydraulic actuating means being well known in this type of machine tool and, forming no part of this invention, need not be further described in detail.

The cross-rail member 29 is of such length as to extend between and beyond the uprights 12 and 13, and at the rear side thereof, at positions alined with the uprights, is provided with vertically extending channel-shaped formations 34 and 35 slidably fitted over the forward faces of the respective uprights 12 and 13, bearing upon the flanges 15 and 16 of said uprights, and held in position by retaining pieces 36, Fig. 4, fitting behind the flanges 15. The cross-rail member 29 is adapted to be adjusted to different elevations or levels on the uprights 12 and 13 with respect to the table 20 thru the medium of two worm shafts or screws 37, one disposed in each of the recesses at the forward edge of its respective upright, and rotatably mounted in bearings mounted in an upper transverse plate 11 and in the lower walls 12a and 13a thereof respectively. Each shaft or screw 37 is threaded thru a nut piece 29a carried by the cross-rail member 29. Rotation of the screws 37 in one direction or the other, results in raising or lowering the cross-rail member 29 to different vertical positions of adjustment; the manner of rotating the screws 37 will be described hereinafter.

It will be appreciated that the weight of the cross-rail member 29, and its associated parts, is very great, and in order to sustain a large portion of this weight, and to reduce the effort or power required for moving these parts, and to provide for easy and smooth adjustment thru the means provided, I employ a counterbalancing mechanism. This mechanism includes a sling or suspension means indicated generally at 38, which preferably is in the form of a flexible steel cable 39. An intermediate portion 40 of the cable 39 is extended beneath spaced idle supporting and guide sheaves 41 and 42, rotatably mounted in brackets 43, fixed to the upper part of the cross-rail member 29. An end portion 44 of the cable is extended upwardly over a sheave 45, carried by a bracket 46 fixed to the adjacent upright 12, thence inwardly of a sheave 47, carried by a bracket 48, thence to a relatively small scored or grooved drum 49, about which drum the cable is wound and to which its end is anchored. The drum 49 is fixed to a considerably larger drum 50. The drum 50 is flanged as at 51, and has its circumferential surface, intermediate the flanges, scored or grooved for the reception of a second cable 52 wound thereon, one end of the cable 52 being anchored to the drum 50. The opposite or free end of the cable carries a counterweight 53. Both the drum 49 and the drum 50 are preferably loosely mounted upon a rotatably fixed shaft or axle 54, the ends of which are supported in brackets 55 and 56, anti friction bearings 57 being employed to insure free rotation of the drums 49 and 50 with respect to the axle 54. The details of this structure are best shown in Fig. 11.

The opposite end portion of the cable 39, indicated at 58, is extended over a sheave 59, supported on the column 13 by a bracket 60, then inwardly of a sheave 61, supported in a bracket 62, and thence to an elongated tubular winding member or drum 63, and anchored thereto. As best shown in Figures 2, 4, and 10, the winding member 63 has a flange 64 at its outer end, and for a considerable distance inwardly along its length it is spirally scored or grooved to suit the cable 58, as at 65. The drum or winding member 63 has a preferably integrally formed extension 66, formed as a worm or screw 67, having threaded engagement with a nut member 68, normally held axially fixed in a bracket 69. The entire drum or winding member 63, including the winding portion 65, and the screw threaded portion 67, is splined, as by splines 70, to a driven shaft 71, one end of which is rotatably supported in a bearing 72, carried by a bracket 73, secured to the adjacent portion of the housing 13.

It will thus appear that when the shaft 71 is rotatably stationary the drum member 63 is likewise rotatably fixed and conversely when the shaft 71 is rotated the drum member 63 will rotate with the shaft. It will also be clear that the rotation of the drum member 63 in the axially and rotatably fixed nut member 68 will cause the drum member to move axially in one direction or the other depending upon the direction of rotation of the shaft 71. The pitch of the scoring or groove on the drum portion 65 is the same as the pitch of the thread on the portion 67 of the drum. As a result of this arrangement, the point at which the cable 58 engages the groove of the drum is always in the same position with respect to the sheave 61 which leads the cable upon or from the drum, that is the angle which the cable 58 makes with the axis of the drum remains constant, for the reason that the scoring travels laterally as the cable is wound upon or unwound from the drum 65. This point at which the cable engages the drum is preferably so arranged that the center line of the cable is in the plane passing thru the center of the groove at the point of tangency between the cable and the drum. This provision prevents any danger of piling up of the cable upon itself and prevents any injury to the outer fibers of the cable such as frequently results from the engagement of the cable with the ridges of the drum scoring, when the cable is fed upon drums at an angle with the plane thru the groove.

An intermediate portion of the shaft 71 extends thru a bearing block 74, and thence into a speed reducer housing 75 supported on a bracket 76, fixed to the housing 12, anti-friction bearings 77, Fig. 10, being employed to rotatably support the shaft end in the housing. Within the housing 75 the shaft 71 has a worm gear 78 keyed thereto. The worm gear 78 meshes with a worm 79 fixedly mounted on a shaft 80 which extends forwardly from the housing 75, toward the front or face of the uprights, 12 and 13, and has its forward end rotatably supported in a bearing bracket 81 mounted on the upper plate 11.

It will be evident that when its worm shaft 80 and hence the worm 79 are not being rotated, the worm gear is prevented from rotating, as a result of which the shaft 71 is likewise normally rotatably fixed when the shaft 80 is not rotated.

Fixed to the forward portion of the shaft 80 is a sprocket wheel 82, over which extends an endless sprocket chain 83, the chain 83 also extending over a somewhat smaller sprocket wheel 84. The sprocket 84 is fixed to a spindle 85, driven by a motor 87 thru suitable reducing gearing housed in the gear head 86.

The driving spindle 85 also has fixed thereon a bevel pinion 88, meshing with a bevel gear 89, adapted to be rotatably fixed to a cross shaft 90 by means of a friction clutch 95. The shaft 90, adjacent its right end, has fixed thereto, a bevel gear 91 meshing with a bevel gear 92 fixed to the upper end of the adjacent vertical adjusting screw 37 disposed in the housing 13, while the opposite or left end of the shaft 90 has fixed thereto a bevel gear 93 meshing with a bevel gear 94 fixed to the upper end of the other screw 37 disposed in the housing 12. Suitable bearings supported on the upper plate 11 are provided for the shaft 90 as indicated at 90a, 90b and 90c. The friction clutch means 95 include a shifter fork 96 operable thru the medium of the shifter rod 97.

Mounted in suitable bearings adjacent the upright 13 is a vertical control shaft 98 upon which is fixed a control handle 99 adjacent its lower end, in position conveniently accessible for the operator. This shaft 98 is located slightly behind the right hand end of the horizontal transverse shafts 90 and 97 as best appears in Figures 1, 2, 8 and 9.

Mounted adjacent the upper end of the control shaft 98 is a collar 100, best seen in plan view in Figures 9 and 9a, formed with a pair of opposed ears, one ear 101 projecting forwardly toward the shifter shaft 97 and the other ear 102 projecting rearwardly.

Fixed to and projecting rearwardly from the shifter shaft 97 and horizontally alined with and normally having its right face (as viewed in Figures 8 and 9) engaging the left face of both ears 101 and 102, is a bracket 103. The ears 101 and 102 are adapted, when the shaft 98 is rotated in either clockwise or counterclockwise direction, as viewed in Fig. 9, to force the bracket 103 in a direction toward the left thus moving the shifter shaft 97 toward the left, against the spring 104, such movement causing the forks 96 to shift the clutch 95 into frictional engagement with the shaft 90. When the operator releases the handle 99, the shaft 98 and control lever 99 are again returned to the position shown in Figures 1 and 9, by the spring 104 which automatically returns the shifter shaft together with the bracket 103 and fork 96 to the position shown in Fig. 9, whereupon the friction clutch member 95 and bevel gear 89 are disconnected from the shaft 90.

Pivotally connected to the ear 102 on the collar is a link 105 to the other end of which is secured a shiftable slide or plunger 106. The forward face 107 of the plunger, as best appears in Fig. 9, is formed with two substantially parallel spaced offset surfaces and an intermediate inclined surface. Engaging the face 107 are spring pressed roller levers 108 and 109, adapted to actuate electrical contact switches 110 and 111, both normally open when the roller levers are in the positions shown. These contact switches are adapted when closed to actuate well known electrical devices to energize the motor 87, one contact switch being adapted to cause the motor to rotate in one direction and the other switch in the other direction.

From the construction described, it will be apparent that a shifting of the lever 99 will produce a rotary movement of the shaft 98 and collar 100 and will, thru the link 105, cause the plunger 106 to move either to the left or right as viewed in Fig. 9, depending on the direction in which the lever 99 is shifted.

A movement of the plunger to the left will cause the roller lever 108 to rotate in a forward direction while the roller lever 109 remains in the position shown. The forward rotation of the lever 108 is sufficient to close the contact switch 109 which will in turn cause the motor 87 to rotate in one direction.

If, on the other hand, the lever 99 and shaft 98 are rotated to cause the plunger 106 to shift toward the right from the position shown in Fig. 9, the lever 109 will rotate in a rearward direction leaving the roller lever 108 undisturbed. This rearward movement of the roller lever 109 causes the switch 111 to close and serves to rotate the motor 87 in a direction opposite to the direction in which it rotates when the switch 110 is closed.

It will be clear that the energizing of the motor by the closing of either of the switches 110 or 111 due to the shifting of the lever 99 is simultaneously accompanied by an engagement of the friction clutch 95 and bevel gear 89 with the shaft 90. The rotation of the shaft 90 thru the bevel gear combinations 91, 92 and 93, 94 respectively, serves to rotate the screws 37, 37 which screws, thru their engagement with the nuts 38, 38 serve to raise or lower the cross rail, depending upon the direction of shift of the lever 99 and the direction of the rotation of the motor induced thereby.

The rotation of the motor 87, thru the shaft 85 and sprocket 84, simultaneously rotates the sprocket 82 and the shaft 80 and worm 79 which in turn causes the rotation of the shaft 71 which causes the rotation and simultaneous axial movement of the drum member 63, as explained.

Operation

The operation of the counterbalancing mechanism is as follows:

Assuming the cross-rail member 29 to be in the position shown in Fig. 1, and the motor 87 and related parts for actuating the screws 37, 37 to be in a non-rotating position, under these conditions the cable 39 is sufficiently taut to support all or the major portion of the weight of the cross-rail member 29, one end portion 58 being anchored to and being wound about the normally stationary drum 63 and the opposite end portion 44 of the cable being wound upon and anchored to the drum 49, which serves to maintain the cable taut because of the gravital influence exerted thereon by the action of the counterweight 53. It will be noted that by reason of the difference in diameters of the drums 49 and 50 a mechanical advantage or increase in leverage is obtained, which reduces the size of the counterweight 53 necessary to produce sufficient tension in the cable to sustain the weight of the cross-rail member 29. In the machine illustrated the weight of the counterweight required to fully counterbalance the weight of the cross-rail and associated parts is only about one tenth of the weight of the parts counterbalanced and this ratio may readily be varied by a suitable variation in the ratio of the sizes of the drums 49 and 50. The drums 49 and 50 may accordingly be said to constitute a force multiplying means.

When it is desired to change the vertical level of the cross-rail member 29, that is when the operator desires to raise or lower the tool 22 and associated parts including the cross-rail, the operator shifts the lever 99 in the desired direction, rotating the shaft 98 correspondingly. This causes the collar at the upper end of the shaft 98 to shift the plunger 106 which closes one or the other of the contact switches 110 or 111 and which, in turn, energizes the motor 87 to rotate in the desired direction.

Simultaneously with the shifting of the plunger 106, the shifter shaft 97 is moved by the engagement of the collar 100 with the bracket 103, causing the clutch 95 to fix the bevel gear 89 to the shaft 90. The rotation of the motor thru the gears 88, 89 and clutch 95 thereupon causes the shaft 90 to rotate. The rotation of the shaft 90 thru the bevel gear sets 91, 92 and 93, 94 cause the screws 37, 37 to rotate which in turn raise or lower the cross rail and associated parts by means previously described.

This raising or lowering of the cross-rail results in the formation of slack in the cable 39 of the sling 38 or results in a requirement for additional length depending on whether the cross rail is raised or lowered. This slack in or requirement for additional cable might be provided for by the winding up or paying out of the cable from the drum 49. This would, however, result in a relatively great and objectionable vertical movement of the counterweight 53 which is avoided as follows:

Simultaneously with the raising or lowering of the cross-rail, the sprocket 84 drives the sprocket 81 and shaft 80 which, thru the worm gear reducing set, rotates the shaft 71. This shaft in turn causes the drum member 63 to rotate and move axially in the desired direction by means of its engagement in the fixed nut member 68 as explained. The diameter of the drum 63 and the speed of rotation of this drum are preferably so selected that the cable 58 is taken up by the drum exactly as fast as the cable becomes available as a result of the upward travel of the cross-rail or is unwound from the drum exactly as fast as the cable is demanded as a result of the lowering of the cross-rail. In the herein described disclosure the lineal speed with which the cable is wound upon the drum is exactly twice the vertical speed of the travel of the cross-rail.

The cable, being wound up on the drum 63 with the same speed as it is made available or demanded by the vertical movement of the cross-rail, leaves the end 44 of the cable substantially stationary and the drum 49 substantially rotatably fixed during the raising or lowering of the cross-rail. As a result the counterweight 53 also remains in substantially the same vertical position during such raising or lowering.

The drum 63 with its associated mechanism therefore serves as a means for varying the effective length of the cable, that is, the free length of the cable between its anchor and the drum 49, which is effective in fixing the vertical position of the tool head and associated parts.

It may therefore be said that the portion of the counterweight mechanism just described automatically follows the cross-rail member 29 and provides automatically functioning means for taking up or paying out cable proportionate to the vertical travel of the cross-rail member and tool head. While it is desirable to maintain the vertical position of the counterweight substantially constant, as stated, a limited vertical travel of the counterweight is usually not objectionable and in this event the accurate ratio between rate of travel of the tool head and the rate of cable take up of the drum 63 need not be maintained.

It will be apparent that the hereinbefore described invention makes it possible to employ a relatively small counterweight to sustain all, or the major portion, of the weight of a relatively heavy cross-rail member, tool head and associated parts. It will also be clear that the counterweight used in this invention needs little or no space for vertical travel, as the mechanism can be so arranged that there is little or practically no movement of the counterweight. Further, it will be apparent that the same counterweighting influence will be automatically exerted in any and all positions of movement or adjustment of the cross rail member. It will also be evident that the above results are automatically obtained without any special act of the operator, as a result of the interlocking relationship between the power means for changing the level of the cross-rail and the mechanism for taking up or paying out cable in co-ordination with the movement of the cross-rail. Also, in view of the absence of any appreciable movement of the cable, there will be little wear thereon, and because of the accurate winding of the cable at a constant angle, upon the compensating take up drum, there will be little wearing or fraying of the cable and no piling up of the cable on the drum.

In the herein disclosed embodiment of this invention, the sling element is illustrated and described as a cable or cable means. It will be understood that a chain, fiber rope, belt or any other equivalent element may be substituted for the cable. Likewise, the sling cable guiding means are shown and described as sheaves or pulleys and it will be understood that any other type of wheel elements such as sprockets, drums, etc. may be used, and that a number of these wheel elements, greater or smaller than that shown, may be used and that they may be assembled in any other arrangement convenient or necessary to effect the desired result.

It is also to be noted that the cable tensioning means 49, 50 hereinbefore described, need not necessarily comprise relatively small and large drums. In view of the provision of the cable take-up compensating device which eliminates the need for much motion of the tensioning means, there could be used, instead of this small and large drum mechanism, a pivoted lever with counterweight or counterbalancing element attached near its free end and with the sling cable 44 attached intermediate the free end and pivot of the lever.

It should also be pointed out that the counterweight 53 set forth in the preceding disclosure might very effectively be replaced by a tension spring member; in fact the disclosed mechanism is ideally adapted for a spring. In the heretofore known counterweighting devices of this class, springs have not been used because of the variations which occur in the tension of a spring as the spring elongates or contracts and which would produce a like variation in the intensity of the counterbalancing effect. In the present application however, the tensioning end of a spring substituted for the counterweight, need not move thru any appreciable distance and, once the anchored end of the spring is adjusted to produce the desired tension, the spring would continue to exert the same tension thruout the complete range of vertical travel of the cross-rail. It is also important to note that a spring does not necessarily have to exert its tensioning force in a vertically downward direction as a spring may be applied to exert its tensioning force in a horizontal or any other direction.

An example illustrating both the above lever type of construction and the spring tensioning type of counterweighting means is illustrated in Fig. 6a. In this figure, 44 indicates the tensioned end of the cable sling which is adjustably connected at a point 112 intermediate the ends of a lever 113, pivotally mounted at one end on the axle 54a, mounted in bearings supported on the upright 12 of the machine. Adjacent the free end of the lever 113 at 114, is connected the tension end of a spring 115, the other end of the spring being anchored to a threaded eye bolt 116, passing thru an opening in a boss 12b fixed on the upright 12. The eye bolt 116 is provided with a pair of adjusting nut means adapted to regulate the tension of the spring 115. It will be evident that the tension exerted by the spring 115 effectively serves to tension the cable sling in a manner similar to the previously described cable tensioning means 49, 50, 52, 53.

Many other modifications of this invention and its application will naturally occur to those skilled in this art and it will be apparent that the embodiment herein described may be variously changed and modified without departure from the spirit of the invention and that the invention is capable of uses and has advantages not herein specifically described; hence it will be appreciated that the herein disclosed embodiment is illustrative only, and I desire not to be limited to the exact construction shown and described.

It will be apparent that this invention can readily be adapted to machines of various classes and that it can be applied without material change to other types of machine tools, such as planers, boring mills, drill presses, milling machines, power presses, forging machinery, and the like. It will also be understood that in its broader aspects this invention is not limited to a machine in which the counterbalanced object is vertically movable and that it may be embodied in machinery in which its counteractive force is to be applied to a horizontally moving object.

It will likewise be clear that the counterweighting force can be applied to a variety of movable parts on machines of this character; for instance, it may be applied to counterbalance a vertical sliding head or swinging arm on a drill press or radial drill, or to counterbalance a combined cross-rail and tool support, as shown in the drawings, on a large surface grinder or planer or boring mill, or to counterbalance a ram on mechanical or hydraulic power presses. It is accordingly intended that the term "tool head" as used in the appended claims be broadly interpreted to include any movable part or combination of parts of the type referred to in apparatus of the class described.

It is to be noted that certain details disclosed in this application but not claimed herein are claimed in my co-pending application Serial No. 638,530, filed December 31, 1945 for Methods of and apparatus for correcting deviations in cross-rails of machine tools.

What I claim is:

1. Apparatus of the character described, including: a housing, a tool head mounted for vertical movement on the housing, means for moving the tool head, cable means mounted on the housing, tensioning means applied to and tending to move one end of the cable means, means associated with the tool head engaging the cable means for applying the cable tension to the tool head in a direction tending to counterbalance the weight of the tool head, and means associated with the cable means intermediate its ends adapted, when the tool head is moved, to control the movement of the tensioned end of the cable means and limit its movement to a rate substantially lower than the rate of movement of the tool head.

2. Apparatus of the character described, including: a housing, a tool head mounted for vertical movement on the housing, means for moving the tool head, cable means mounted on the housing, a tensioning device applied to one end of the cable means, means associated with the tool head engaging the cable means for applying the cable tension to the tool head in a direction tending to counterbalance the weight of the tool head, and take up mechanism, independent of the tensioning device, associated with the cable means adapted to take up slack developed in the cable resulting from the upward movement of the tool head and power means adapted to actuate said mechanism.

3. Apparatus of the character described, including: a housing, a tool head mounted for vertical movement on the housing, means for moving the tool head, cable means mounted on the housing, a tensioning device applied to one end of the cable means, means associated with the tool head engaging the cable means for applying the cable tension to the tool head in a direction tending to counterbalance the weight of the tool head, and takeup means, independent of the tensioning device, associated with the cable intermediate its ends adapted to take up cable length proportionate to the vertical movement of the head.

4. Apparatus of the character described, including: a housing, a tool head mounted for upward and downward movement on the housing, means for moving the tool head, a cable mounted on the housing, a cable tensioning device applied to one end of the cable, means associated with the tool head engaging the cable for applying the cable tension to the tool head in a direction tending to counterbalance the weight of the tool head, and power means associated with the cable adapted to take up or play out cable length proportionate respectively to the upward or downward movement of the head.

5. Apparatus of the character described, including: a housing, a tool head mounted for vertical movement on the housing, means for moving the tool head, a cable mounted on the housing, a cable tension device applied to one end of the cable, means associated with the tool head engaging the cable for applying the cable tension to the tool head in a direction tending to counterbalance the weight of the tool head, and take up means associated with the cable intermediate its ends adapted to take up length of cable at a rate substantially equal to the rate at which slack is developed in the cable due to the vertical movement of the head whereby the position of the tensioned end of the cable remains substantially constant.

6. Apparatus of the character described, including: a housing, a tool head mounted for vertical translation on the housing, means associated with the housing and tool head adapted to vertically translate the tool head on the housing, and counterbalancing means for said tool head including cable means supported on the housing, said cable means being anchored on said housing at one end and provided with tensioning means at the other end and engaged intermediate its anchored and tensioned ends with the tool head to transmit the pull of the tensioning means to the tool head, and means intermediate the anchor and tensioning means adapted to vary the length of the cable between the anchor and tensioning means.

7. Apparatus of the character described, including: a housing, a tool head mounted for vertical movement on the housing, mechanism associated with the housing and tool head adapted to vertically move the tool head relatively to the housing, means for actuating said mechanism, and counterbalancing means for said tool head including cable means, anchor means at one end of the cable means, tensioning means at the other end of the cable means, means adapted to transmit the pull of said cable tensioning means to said tool head, and automatic means interlocked with the said tool head moving mechanism for varying the length of the cable between said anchor means and said tensioning means, as the tool head is vertically moved.

8. Apparatus of the character described, including: a housing, a tool head mounted for vertical movement on the housing, mechanism associated with the housing and tool head adapted to vertically move the tool head relatively to the housing, means for actuating the said mechanism, and counterbalancing means for said tool head including cable means and cable tensioning means, a portion of said cable means being in the form of a sling adapted to transmit the pull of the tensioning means to the tool head, in a direction to counterbalance the weight of the tool head, and automatic means interlocked with said mechanism for varying the effective length of the sling as the tool head is moved vertically.

9. Apparatus of the character described, including: a housing, a tool head mounted for vertical movement on the housing, mechanism for vertically moving the tool head, pulley means associated with the tool head, cable means anchored at one end and provided with tensioning means at the other end and formed intermediate said ends with a depending sling portion engaging said pulley means for applying the effect of the tensioning means in a direction to counterbalance the weight of the tool head, and power means for varying the length of the sling portion.

10. Apparatus of the character described, including: a housing, a tool head mounted on said housing and subject to gravital force, relatively stationary counterbalancing means adapted to oppose the gravital force, means providing a sling suspension adapted to at least partially support said tool head, said sling suspension having one end portion subject to the influence of said counterbalancing means, and means connected to the opposite end portion of said sling suspension for varying the supporting level thereof between said end portions.

11. Apparatus of the character described, including: a housing, a tool head mounted for vertical movement on the housing, mechanism associated with the housing and tool head, adapted to vertically move the tool head, means for actuating the said mechanism, and counterbalancing means for said tool head including a cable anchored on the housing at one end and provided with tensioning means at the other end and connected with said tool head for transmitting the pull of said tensioning means to said tool head, rotatable drum means engaging the cable and adapted, when rotated, to vary the length of the cable between the said anchor and said tensioning means, and means for rotating said drum means.

12. Apparatus of the character described, including: a housing, a tool head mounted for vertical movement on said housing, screw means associated with the housing and tool head adapted to vertically move the tool head, means for actuating the said screw means, and counterbalancing means for said tool head, including cable means anchored at one end and provided with tensioning means at the other end and supported on said housing and connected with said tool head to transmit the pull of said tensioning means to said tool head, and rotatable drum means engaging the cable means and adapted, when rotated, to vary the free length of the cable between the anchor and the tensioning means, and means interlocked with the screw actuating means for rotating said drum simultaneously with the screw actuating means.

13. Apparatus of the character described, including: a housing, a tool head mounted for vertical movement on the housing, means for counterbalancing the tool head including a cable supported on the housing, said cable being provided with a tension device at one end and an anchor at the other end, and a rotatable drum adapted, when rotated, to wind thereon a portion of the cable between the tension drum and the anchor, means for rotating the drum, and means for guiding the cable onto the drum at a constant angle with the axis of the drum.

14. Apparatus of the character described, including: a housing, a tool head mounted for vertical movement on the housing, means for counterbalancing the tool head including a cable guided intermediate its ends on a pulley, a rotatable drum adapted to wind thereon a portion of the cable passing over said pulley, means for rotating the drum and means for advancing the drum axially relatively to the pulley as the drum is rotated.

15. Apparatus of the character described, including: a housing, a tool head mounted for vertical movement on the housing, means for counterbalancing the tool head including a cable guided intermediate its ends on a pulley, a rotatable drum adapted to wind thereon a portion of the cable passing over said pulley, said drum being formed with peripheral scoring adapted to receive the cable, means for rotating the drum, and screw means adapted to axially advance the drum a distance equal to the pitch of the scoring during each revolution of the drum, whereby the angle formed between the axis of the drum and the center line of the cable running from the pulley to the drum remains constant.

16. Apparatus of the character described, including: a housing, a tool head mounted for vertical movement on the housing, means for counterbalancing the tool head including a cable supported on the housing, said cable being provided with a tension device at one end and an anchor at the other end, and a rotatable drum adapted, when rotated, to wind thereon a portion of the cable between the tension device and the anchor, means adapted, when the drum is rotated, to advance the drum axially, and means for rotating the drum.

17. Apparatus of the character described, including: a housing, a tool head subject to a gravital force, said tool head being movable to different vertical positions, mechanism for moving the tool head, movable counterbalancing device for generating a counteractive force opposing the gravital force influencing said tool head, mechanism mounted on the housing for effecting the follow-up application of said counteractive force to the tool head, regardless of its position, and leverage means interposed between said counterbalancing device and said mechanism, adapted to increase the counteractive force of said counterbalancing device relatively to the weight of the tool head and to increase the movement of said counterbalancing device, and means interlocked with said tool head moving mechanism adapted to reduce the movement of the counterbalancing device.

18. Apparatus of the character described, including: a housing, a tool head vertically adjustable upon said housing, power means for adjusting said tool head, counterbalancing means, a cable having one end portion subject to the influence of said counterbalancing means and an intermediate portion disposed in supporting relation to said tool head, and winding means interlocked with said power adjusting means and associated with the opposite end portion of said cable for taking up or paying out said cable.

19. Apparatus of the character described, including: a housing, a tool head vertically adjustable upon said housing, counterbalancing means, a cable having one end portion subject to the influence of said counterbalancing means and an intermediate portion disposed in supporting relation to said head, anchor means associated with the opposite end portion of said cable, drum means adapted, when actuated, to wind thereon a portion of the cable, adjusting screws for adjusting the head with respect to said housing, and interconnected drive means for simultaneously actuating said winding means and said adjusting screws.

20. Apparatus of the character described, including: a housing, a tool head adapted to be raised and lowered to different vertical positions on the housing, counterbalancing means adapted for at least partially counterbalancing the weight of the tool head, cable means adapted to receive and to transmit the tension of the counterbalancing means to the tool head in a direction counter to the weight of the tool head, means for raising and lowering the tool head, and mechanism interconnected with said raising and lowering means adapted to maintain the tension receiving portion of the cable means at substantially the same position during the raising and lowering of the tool head.

21. Apparatus of the character described, including: a housing, a tool head subject to gravital influence and shiftable to different positions on the housing, counterbalancing means, means providing a sling suspension disposed about said tool head for at least partially supporting the same, said sling suspension having one end portion connected with and subject to the influence of said counterbalancing means, means for varying the intensity of the counterbalancing means, power actuated means for shifting said tool head and mechanism interconnected with said power actuated means adapted to maintain the intensity of said counterbalancing means substantially constant during the shifting of said tool head.

LAD L. HERCIK.

REFERENCES CITED

The following references are of record in the file of this patent:

UNITED STATES PATENTS

| Number | Name | Date |
|---|---|---|
| 2,370,813 | Portman et al. | Mar. 6, 1945 |
| 1,126,212 | Hendee | Jan. 26, 1915 |
| 2,364,318 | Schauer | Dec. 5, 1944 |